Patented Feb. 25, 1936

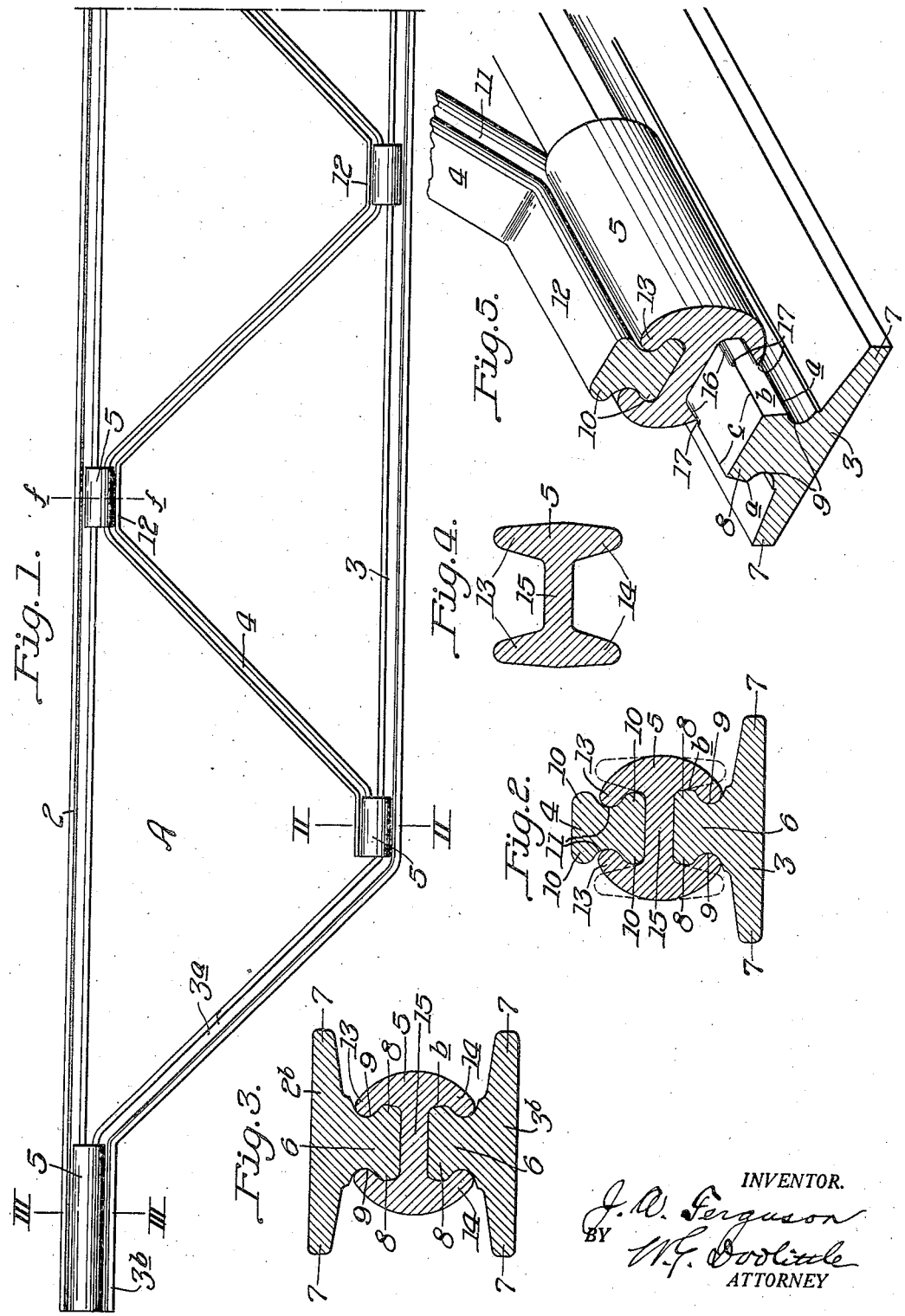

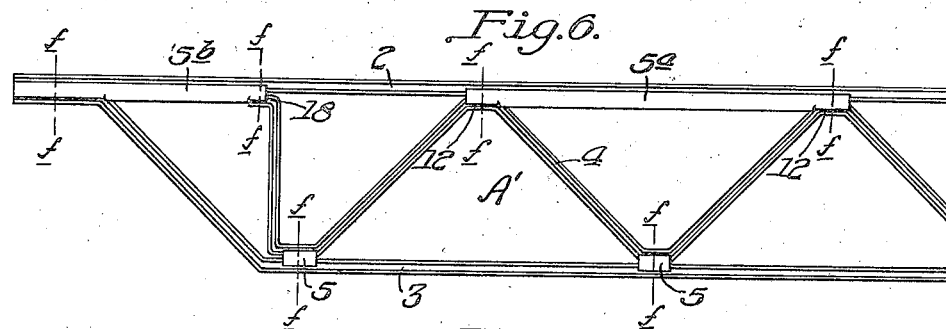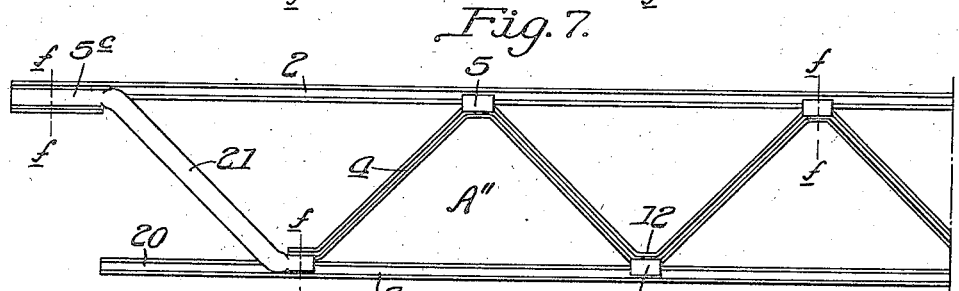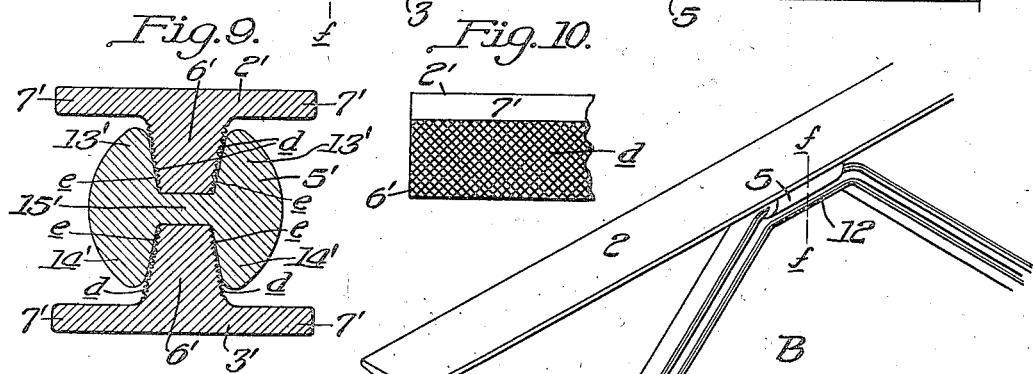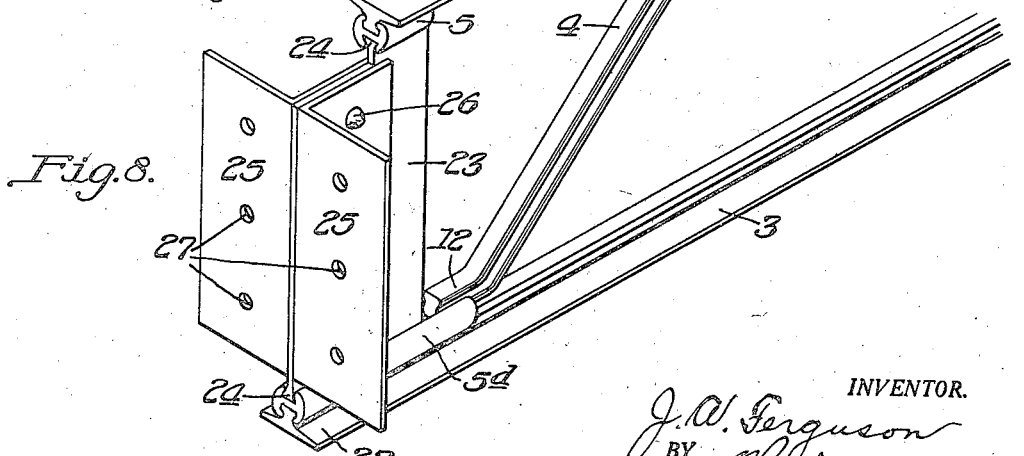

2,031,765

UNITED STATES PATENT OFFICE 2,031,765

METALLIC STRUCTURAL FRAMEWORK

John Ashley Ferguson, Pittsburgh, Pa., assignor of one-third to Thomas B. Sturges, Pittsburgh, Pa.

Application April 19, 1932, Serial No. 606,143

5 Claims. (Cl. 189—37)

My invention relates to structural frameworks, and more particularly to new and improved structural members and in combining said members to form structural metal units such, for example, as trusses, beams, girders and the like, without the use of bolts, rivets and the like, and without welding the parts together as has heretofore been the practice.

Present fabricated joists, girders, trusses or the like, wherein rivets or bolts are employed for securing the members thereof together, are dependent for their strength upon the individual strengths of the riveted or bolts joints, necessitating increased metal area adjacent the rivet or bolt holes to prevent shearing and deformation to compensate for the cross sectional area removed in punching the rivet or bolt holes. So, also, a truss or joist fabricated by welding is dependent upon the efficiency of the welded joint, which in turn is dependent upon the skill of the welder.

It is a prime object of my invention to provide structural members so designed and constructed that they may be fabricated into a joist, truss or the like without the use of the aforesaid securing means, and contemplates means formed integrally with the said members cooperating with a joining or clamping member or bar for fastening the members together according to some predetermined configuration or design.

A further object is to provide a construction embodying chord, web and connecting members having cooperative elements functioning so that varying sizes of members may be utilized and arranged cooperatively in assembled units of varying dimensions, with a minimum number of shapes and sizes for each unit.

Additional objects and advantages will become apparent from the following description taken in connection with the accompanying drawings, wherein:

Fig. 1 is a side elevational view of a portion of a structural joist embodying my invention;

Fig. 2, an enlarged detail sectional view taken along the line II—II of Fig. 1;

Fig. 3, an enlarged detail sectional view taken along the line III—III of Fig. 1;

Fig. 4, an enlarged cross-section of the clamping member bar in expanded or open position;

Fig. 5, a perspective view partly in cross-section, showing a chord and a web member joined by means of the clamping member;

Figs. 6 and 7, partial views in side elevation of modified forms of structural joists constructed in accordance with my invention;

Fig. 8, an enlarged perspective view of the end portion of a structural joist or girder, showing means applied thereto for attaching to another joist or girder;

Fig. 9, a cross-section similar to Fig. 3, showing a modified form of my invention; and Fig. 10, a side elevation of a portion of one of the chord members of Fig. 9.

Referring to the drawings, A designates generally an open-work structural framework unit or joist, comprising upper and lower chord members 2 and 3 respectively, and an intervening web member 4, the latter being preferably in zig-zag form so as to be alternately secured to the upper and lower chord members by means of clamping members or bars 5. As shown in Fig. 1, the lower chord member 3 is bent upwardly to form an inclined portion 3a, and thence in a direction parallel to the upper chord member 2, as at 3b, for fastening to the upper chord member by means of a clamping member or bar 5. It will be understood that the construction shown may be duplicated at the other end of the structure.

The exact design and configuration of the joist or truss A may be varied within the skill of the designer, the structural members of my invention lending themselves to a varied application in structural framing. The particular elements of my structural members constitute an important part of this invention and are hereinafter described in detail. Said members may be formed of any suitable metal by rolling or drawing by means of dies into their desired shapes.

The chords members 2 and 3, as illustrated and as preferred, are similar in configuration and each comprises a structural shape that may be formed from any suitable metal by a rolling process. Each chord includes a longitudinal vertically extending central body or a web portion 6, wide horizontally extending flanges 7 positioned upon opposite sides of the web, correspondingly positioned narrow flanges 8, relatively deep longitudinally extending rounded grooves 9 formed in opposite sides of the body or web and between pairs of said wide and narrow flanges, said grooves being formed in such a manner as to produce longitudinally extending sharp edges $a$ at the intersection of the outer surfaces of the said grooves and the faces $b$ of the narrow flanges.

While the narrow flanges 8 may be of various shapes, I prefer to form the same having the outer faces $b$ thereof substantially flat and oppositely inclined at an inclination diverging toward the flanges 7, thus forming longitudinally extending sharp edges c spaced from and disposed parallel to the said edges a.

The web member 4 is generally I-shaped in cross-section, having upper and lower spaced-apart longitudinally extending flanged heads 10, preferably formed with rounded edges, and a narrowed central body portion therebetween formed with relatively deep rounded grooves 11. As stated, the web member 4 may be bent into zig-zag configuration, and is further formed with alternate straight portions 12 disposed, when the members are assembled, parallel to the chord members 2 and 3 at panel points, designated by the lines f—f.

For the purpose of securing the web member to the chord members, and also to fasten the lower chord portion 3b to the upper chord member 2, the clamping bar or member 5 is utilized. Said clamping member or bar may be rolled out into its structural shape and then cut up into smaller sections as desired. The bar or member 5 is generally H-shaped in cross-section and includes a pair of longitudinally extending upper spaced-apart tapered and rounded elements, flanges or ribs 13, and a like pair of lower spaced-apart elements 14, said pairs of elements being separated by means of an integral transverse body portion 15. The distance between the base portions of each pair of spaced-apart ribs is substantially equal to the width of the narrow flanges 8 of the chords 2 and 7 and/or the width of the flanged head 10 of the web member 4.

In assembling or fabricating the joist or structural unit A, the chord and web members are positioned as shown. A clamping member or bar 5 is inserted between the chord and web members at the parallel web portions 12, said clamping members receiving the narrow flanges 8 of the chord member between one pair of its spaced-apart ribs, and a flanged head 10 of the web member between the other pair of ribs, said flanges and head contacting with the transverse body portion 15 of the clamping bar. In a like manner, the flanges 8 of the upper chord member 2 and lower chord portion 3b are entered between the pairs of ribs of a clamping bar 5.

The said clamping members or bars 5 are then subjected to a pressing or bending operation, whereby the pairs of spaced-apart ribs 13 and 14 are bent inwardly in such a manner as to embrace the flanges 8 and/or the head 10 as the case may be. That is to say, the pair of ribs of the clamping bar 5 between which flanges 8 have been positioned are bent toward one another so that their rounded edges are forced into the grooves 9, and the ribs straddling a head 10 of the web member are pressed into the grooves 11 thereof (see Figs. 2 and 3). This clamping operation is done under considerable pressure so as to partially deform the interfitting and cooperating elements of the clamping member or bar and the chord and/or web members.

As shown in Fig. 5, the sharp edges a and c of the flanges 8 are deformed by the clamping operation, as indicated at 16, thereby preventing longitudinal movement of the clamping bar 5 with respect to the chord member 3, due to the formation of slight shoulders 17 in said edges.

The designs of the members of my invention have been found to be readily adaptable to the construction of all types of structural frameworks, and the regular method of designing a truss, joint, or other framework to be fabricated from such members may be followed. In other words, the characteristics of the sections of my members may be readily computed by one skilled in the art, and a standarized grouping of shapes and sizes formulated to enable the designer to apply the same to various structures. Also, it is to be noted that by the use of said members in the design of a framework or joist, the total weight of metal used may be materially reduced due to the fact that the increased metal area necessary in a similar structure employing bolts or rivets may be eliminated. And, further, there are no bolt or rivet-receiving openings in the structure embodying my invention. Fig. 6 illustrates a modified form of joist A', wherein the clamping bars 5 are employed as before in conjunction with the lower chord member 3, and in addition a somewhat longer clamping bar 5a is secured to the top chord 2, as shown, for securing the web member 4 to said top chord at a plurality of its straight portions 12. Said clamping bar 5a also serves as a reinforcing member for the upper chord member and, as illustrated, extends continuously between a plurality of panel points f—f. A second elongated clamping member 5b may be employed at the ends of the joist for securing the upper and lower chord members together, and also extending inwardly therefrom to secure the upper end 18 of the web member, thereby tying said web member into the supporting portion of the joist, and serving to reinforce the upper chord member.

In applying the elongated clamping bars 5a and 5b to the upper chord member 2, the upper pairs of flanges thereof are preferably bent or pressed into the grooves 9 of said chord member throughout the entire length of said clamping members; whereas, the lower flanges thereof engaging the web member 4 are bent or pressed into the grooves of said web at the panel points f—f only.

The structural framework or joist A'' of Fig. 7 is generally similar to the form of Fig. 1, with the exception that the lower chord 3 is extended toward the end of the structure, as at 20, and the endmost clamping member or bar 5c is employed for joining the end portions of the upper and lower chords proper, said bar 5c being formed with an inclined connecting portion 21 extending therebetween.

The square-ended framework or joist B, Fig. 8, is illustrative of the application of the members of my invention to various forms of structural frameworks. In such construction, the lower chord member 3 extends beyond the ends of the upper chord member 2, as at 22, to secure the wide end of a framing member or plate 23. Said plate is formed with upset portions 24 at opposite ends thereof for engagement by a clamping bar 5, also secured to the upper chord member 2, and an elongated clamping bar 5d engaging the lower chord member extension 22 by its narrow flange. Said clamping bar 5d also secures the lower end portion of the web member 4, as shown.

For the purpose of securing the framework or joist B in right-angle relationship to another joist, or for fastening to a column, angle members 25 are provided, said angle members being bolted or riveted at each side of the plate 23, as at 26, with outturned opposed flanges formed with openings 27 for bolting or riveting to the structure to which said joist is to be secured. For example, a plate similar to the plate 23 may be secured midway of a joist or other framework to which said angle members 25 may be bolted or riveted by means of the openings 27.

Figs. 9 and 10 illustrate a modified form of my invention consisting of an alternative form of chord member and means for securing the clamping member or bar thereto. In such construction, the chord members 2' and 3' are each provided with a longitudinal vertically extending central body or web portion 6' and wide horizontally extending flanges 7' positioned on opposite sides of said web.

The outer faces d of said web or body portion 6' are preferably oppositely inclined at an inclination diverging toward said flanges 7', and are serrated, knurled, or otherwise provided with a rough surface constituting friction means for engagement by the clamping member 5'.

The clamping member or bar 5' is generally similar to the clamping members described herein, having a cross-section of H-shape and including pairs of longitudinally extending spaced-apart flanges or ribs 13' and 14' disposed at opposite sides of an integral transverse body portion 15'. The inner faces e of said ribs 13' and 14' are oppositely inclined at an inclination corresponding to the faces d of the chord body or web portions 6', the distance between the faces e of each pair of ribs being substantially equal to the distance between the faces d of the chord members.

In assembling or fabricating the joist or structural units described herein, the clamping members 5' are heated to a high degree and applied to the web portions 6', as in Fig. 9, with the faces e of the clamping members engaging the friction faces d of said chord members. Upon cooling, the clamping members contract and engage the friction surfaces in binding relation. The clamping effect of said members 5' may be enhanced by forming the same heavier, as shown in Fig. 9.

When said clamping member is employed between a chord member and the web member of a structural unit, the binding engagement with the body portion 6' of the chord member is effected, as described, and the engagement with the web member is produced by the application of a clamping or bending force, as will be readily understood.

I claim:

1. A structural frame unit comprising upper and lower chord members, a web member extending between the chord members, an elongated clamping member extending between a plurality of panel points, cooperating attaching means of said chord, web and clamping members, a second elongated clamping member engaging and securing adjacent end portions of said chord members, said second clamping member extending along the upper chord member and engaging the web member at an adjacent panel point.

2. In a structural frame unit, spaced-apart structural frame members each formed with a longitudinally extending body portion and a longitudinal groove, a web member having a longitudinal rounded groove extending between said members, a longitudinally extending flange on said web member, and a separable clamping bar cooperating with said body portions, grooves and flanges for securing any of said members together, the grooves of the frame members being similar to the groove of the web member.

3. In a built-up structural unit, a separable clamping member for connecting a chord member having continuous longitudinally extending grooves on opposite sides thereof and a web member having continuous longitudinally extending rounded grooves on opposite sides thereof, said clamping member including a central body and flanged side portions, the latter being adapted to be entered in the said grooves.

4. In a built-up structural unit, the combination with flanged and side-grooved compression and tension members each having continuous rounded grooves, of a flanged and rounded side-grooved web member, and a clamping member for securing the web member to the compression member having flanges entered in the grooves of the web and compression members and said clamping member clamped thereto.

5. In a built-up structural unit, a chord member having longitudinally extending rounded grooves on opposite sides thereof, a web member having a central body portion, flanged heads and longitudinally extending rounded grooves therein, a clamping member extending longitudinally of said chord member between panel points, said clamping member having a central body portion disposed between the chord and web members and flanged side portions entered in the grooves of said members.

JOHN ASHLEY FERGUSON.